United States Patent [19]
Tonn

[11] 3,993,171
[45] Nov. 23, 1976

[54] FLUID SEAL PISTON AND CYLINDER ASSEMBLY FOR A DISC BRAKE

[76] Inventor: Erwin W. Tonn, 7734 S. Christiana, Chicago, Ill. 60652

[22] Filed: May 21, 1975

[21] Appl. No.: 579,470

[52] U.S. Cl. .................................. 188/72.4; 188/370
[51] Int. Cl.² .......................................... F16D 55/18
[58] Field of Search ................ 188/72.4, 72.1, 72.5, 188/351, 196 A, 196 R, 73.1, 370; 74/18, 18.2 X; 92/98, 99, 102

[56] References Cited
UNITED STATES PATENTS

| | | | |
|---|---|---|---|
| 2,359,516 | 10/1944 | Frank | 188/72.4 X |
| 2,385,625 | 9/1945 | Hopmans | 188/351 X |
| 3,354,992 | 11/1967 | Cook et al. | 188/72.4 |
| 3,526,171 | 9/1970 | Barnes | 74/18.2 X |
| 3,645,362 | 2/1972 | Scheibe | 188/196 A X |
| 3,659,685 | 5/1972 | Stipanovic | 188/72.5 |
| 3,675,743 | 7/1972 | Thompson | 188/72.5 |

FOREIGN PATENTS OR APPLICATIONS 1,351,786  12/1963  France .............................. 188/370

*Primary Examiner*—George E. A. Halvosa
*Assistant Examiner*—Douglas C. Butler
*Attorney, Agent, or Firm*—Leo J. Aubel; Gerald T. Shekleton

[57] ABSTRACT

A cylinder and piston subassembly including an improved fluid seal comprising a relatively loosely fitting piston within a cylinder structure and having a resilient diaphragm adhesively attached to a face of a piston and/or the cylinder structure.

1 Claim, 6 Drawing Figures

U.S. Patent  Nov. 23, 1976  3,993,171
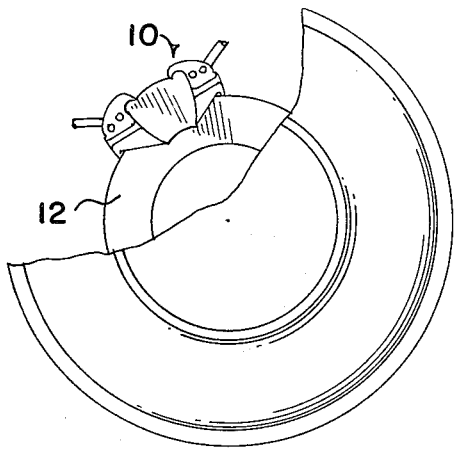
FIG_1_ PRIOR ART
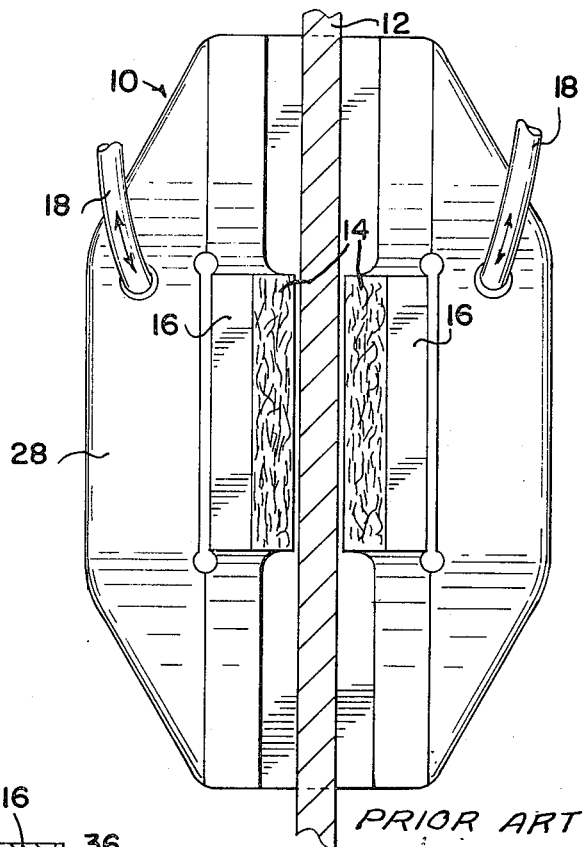
FIG_2_ PRIOR ART
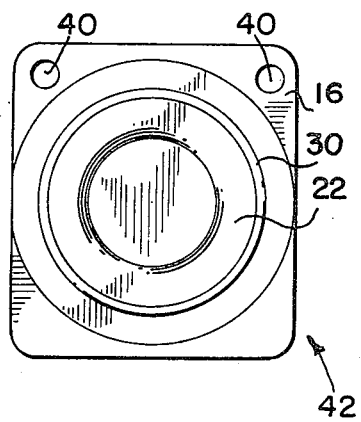
FIG_3_
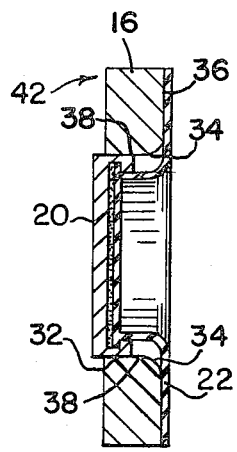
FIG_4_
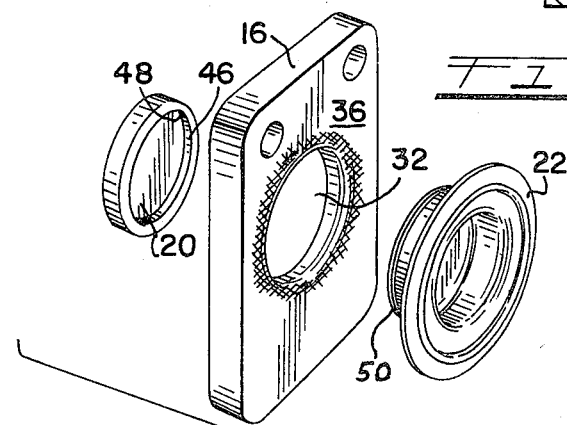
FIG_6_
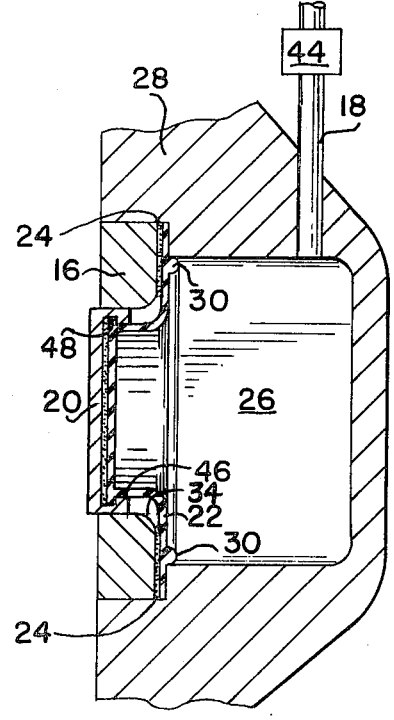
FIG_5_

FLUID SEAL PISTON AND CYLINDER ASSEMBLY FOR A DISC BRAKE

BACKGROUND OF THE INVENTION

This invention relates to an improved fluid seal for a piston and cylinder subassembly which transmits pressure from a pressure chamber through a cylinder structure by means of a piston to an outside object, and, more particularly, to an improved fluid seal for a disc brake caliper which transmits internal pressure to the brake pad. The term fluid as used herein includes a liquid or air medium.

Disc brakes have recently come into their own in the automotive field as a result of their superior performance when compared with the standard drum brake. Disc brakes allow a shorter stopping distance in automobiles, a more dependable braking capability and a wider range of operating conditions than the standard drum brake. However, the disadvantages of the disc brake, in that they are time consuming and costly to assemble, has lead to a rather slow acceptance in automotive circles. These disadvantages relate more to the difficulties of manufacture and the subsequent repair work rather than to the working performance of a disc brake assembly. For instance, should the O-ring seal between the cylinder and piston walls be defective or degraded through use, and dirt is allowed to enter, the precision-machined walls would become scored, occasioning a leak of brake fluid. Repair of this malfunction requires a mechanic to employ a machinist to replate and machine the surfaces scored, at a cost of much lost time and money. Furthermore, it is well known that automobile manufacturers tend to rank ease of manufacture high on their list of priorities, and this reason alone has contributed greatly to the slow adoption of the disc brake by automotive manufacturers.

A main source of difficulty of manufacture of present disc brake assemblies lies in the necessity of keeping a close tolerance between the piston and the cylinder in which the piston is inserted, thereby requiring machining to a very close tolerance and necessitating the use of several additional components to guarantee a fluid-tight seal. Thus, in addition to the close machining required in both the cylinder and the piston, an O-ring is necessary in the present form of disc brakes to insure a tight seal. This O-ring is seated in a groove which must be further machined into the cylinder walls. The end result of all this time-consuming machining and extra components is an increase in cost of the entire assembly. In operation, these close tolerances tend to wear away with time, and so require either new parts and new machining to size or a replating and subsequent machining to size of both the piston and the cylinder, all of which can be very time consuming and costly.

The present invention overcomes the aforementioned disadvantages in the difficulties of the manufacture and repair of disc brake assemblies, as well as providing new advantages in the use of a disc brake assembly.

SUMMARY OF THE INVENTION

The present invention does away with the requirement of the close fitting tolerances of the prior art disc brake assemblies and replaces them with a simple relatively loose fitting piston and cylinder assembly, such assembly being fluid-tight by means of a permanently flexible diaphragm or seal adhering to either the piston face and cylinder housing of the subassembly or the piston face alone. In using such a flexible diaphragm as sealant, the present invention does not require the machining necessary as in present disc brake calipers nor does it need the O-ring with its machined seat to effect the fluid-tight seal. In fact, these components may simply be cast or molded with no further work necessary to attain the proper size. The cylinder structure in which the piston travels is itself detachable from the pressure chambers as a unit, thereby contributing to ease of repair. All moving parts are located within the cylinder housing, and relatively little wear to the caliper assembly or any of its components takes place due to the movement of the piston within the cylinder structure as a result of the greater freedom of movement created by the lack of close tolerance. The life of such a device is thereby greatly extended. Further, the hydraulic fluid within the pressure chambers of the present disc brake has a penchant for picking up foreign matter and thereby contributes to the wear in the cylinder and piston by the action of such foreign matter within the area encompassed by those surfaces. It is obvious, then, that a brake assembly with no opportunity for leaks caused by the entrance of dirt between the moving surfaces of the piston and cylinder walls, as a result of the sealing diaphragm being interposed between the hydraulic fluid and those surfaces, will enjoy an even longer life. This increase in the life span of a disc brake caliper assembly is realized by the present invention. Since the brake fluid does not come into contact with the piston or cylinder walls, no amount of wear in that area can influence the fluid tight seal of the resilient diaphragm. Further, even if wear does occur through the entrance of foreign matter from other sources, or through excessive and hard use, the performance of the brake itself is not denigrated, since the full pressure applied is wholly transmitted to the brake pad.

It is therefore an object of this invention to provide a new and unique means to transmit pressure from a pressure chamber through a cylinder housing by means of a piston to an outside object.

Another object of this invention is the provision of a piston and cylinder assembly for a disc brake caliper unit which is easy to manufacture and has a long life.

A further object of this invention is a piston and cylinder assembly for a disc brake caliper unit and subsequent replacement with a new or reconditioned unit.

A still further object of this invention is an inexpensive means of manufacture and repair of disc brake calipers.

Yet another object of the present invention is a means for excluding dirt and other foreign matter from the piston and cylinder walls of a disc brake caliper.

DESCRIPTION OF THE DRAWINGS

Further objects of the invention, together with additional features contributing thereto and advantages accruing therefrom, will be apparent from the following description of one embodiment of the invention when read in conjunction with the accompanying drawings wherein:

FIG. 1 shows a tire partially cut away to show a typical automotive disc brake caliper mounted on a brake disc.

FIG. 2 shows another view of a disc brake caliper with the brake disc being in cross section.

FIG. 3 shows a top view of the piston and cylinder subassembly of the preferred embodiment of the present invention with the flexible diaphragm attached.

FIG. 4 shows an exploded view in perspective of the piston and cylinder subassembly of FIG. 3.

FIG. 5 is a cross section showing the attachment of the piston and cylinder subassembly to the pressure chamber of a disc brake caliper assembly.

FIG. 6 shows a side view of an embodiment of the piston and cylinder subassembly in cross section.

Referring now to FIG. 1, there is shown a common disc brake caliper assembly 10 mounted on a brake disc 12 for the purposes of providing braking power for the wheel and tire shown therein.

A better view of this caliper assembly 10 may be seen in FIG. 2 where the brake disc 12 is shown in cross section and the pair of brake pads 14 are shown in an open or nonbraking position. In the usual manner of operation of disc brakes these brake pads 14 are moved towards each other within the caliper housing 28 by means of a force applied hydraulically through conduit means 18 to a pressure chamber 26. The increased pressure within this chamber is translated into a lateral motion outward by the brake piston 20, so as to push one or both of the brake pads 14 towards the other so that the brake disc 12 is grabbed in a pincer-like fashion thereby causing the rotating brake disc 12 to slow down or stop.

As stated above, in one embodiment this invention relates to a fluid seal for a piston and cylinder subassembly which hydraulic pressure to a brake pad within a disc brake caliper assembly 10. FIG. 4 shows this unique means in an exploded view as including a cylinder structure or housing 16, a piston 20, and a resilient diaphragm or sealing means 22. The relationship of these three components in one embodiment of the present invention can be seen in FIG. 6 where the piston 20 is movably seated within the cylinder structure 16 through the opening 32. The piston 20 preferably has an inwardly extending peripheral lip or flange 46 on its inside face. The resilient diaphragm 22 has a corresponding outwardly extending flange 50 as shown in FIG. 4 which extends into the recess 48 between the flange 46 and the piston body 20 (thereby mechanically securing the diaphragm to the piston). The resilient seal can also be secured to the inside face of the cylinder structure 26. It must be relatively thin over the face of the piston, so that the entire force generated within the pressure chamber 26 is transferred to the piston, rather than being absorbed in the diaphragm.

The means of attachment of the diaphragm to the cylinder assembly can be effected by any of the several means; an effective one involves the use of uncured polymers of suitable characteristics. This method requires those polymers commonly referred to as rubber, whether butyl, silicone, neoprene, or others. The application of the rubber to the surface of the cylinder housing 16 and piston face necessitates roughening those surfaces by sandblasting, steel wool or other suitable means, application of a suitable adhesive or primer, and the uncured rubber is then injected or poured onto these assembled pieces, molded to the desired configuration, and cured by conventional means.

Another method for providing a diaphragm of such material would be to pre-mold and cure the desired rubber so that the finished article conforms to the shape of the cylinder and piston unit when assembled. Upon attachment of this pre-molded diaphragm to the unit, with a suitable adhesive on the face of both the cylinder housing and the piston, as in the previous example, a retaining spring clip (not shown) within the recess 48 may be used as an additional means of holding the diaphragm in place.

It will be noted that on the face of the cylinder housing 36 to which the resilient seal 22 is attached, the inside corners 34 of the cylinder chamber 32 are rounded, and no adhesive is placed on these corners 34 or on the cylinder walls 38 of the opening 32. This allows increased freedom of movement for the piston 20 within the cylinder chamber 32. For purposes of better demonstrating the freedom of movement of the resilient seal 22, the amount of free play and space at the inside corners 34 has been exaggerated in FIGS. 5 and 6.

In certain applications, and as shown in FIG. 6 the diaphragm 22 may be attached to the cylinder housing 16 depending solely on the pressure of the cylinder assembly 42 against the caliper assembly 10 and the raised ring 30 to effect placement and seal of the piston and cylinder subassembly.

In FIG. 5 may be seen a preferred embodiment of the present invention wherein an integral raised ridge 30 around the circumference of the resilient seal closely conforms to the outline of the outer edges of the pressure chamber thereby aiding in the accomplishment of a fluid-tight seal of the pressure chamber. The position of this integral circumferential ridge 30 can be better seen in FIG. 3 where the ridge is shown to completely surround the area to be sealed.

Another feature of the present invention is illustrated in FIG. 6 where no such integral circumferential ring or ridge exists on the seal. Here the seal is effected solely through the resilience of the diaphragm itself.

When in operation, pressure is increased through the conduits 18 to the pressure chamber 26. This causes a force to be exerted on the cylinder assembly 16, and more specifically, on the disc brake piston 20. In spite of the increased pressure on the cylinder assembly 16 and disc brake piston 20, the entire assembly is still fluid tight as a result of this resilient diaphragm 22. Thus the force is transmitted to the brake piston 20 which in turn transmits that force to the brake pads 14 to be transformed into a braking action on the brake disc 12. Upon a release of the pressure from the conduit means and in the pressure chamber, the brake piston 20 returns to its original position thereby releasing the pressure exerted on the brake disc 12. Thus it can be seen that the brake piston 20 moves in a somewhat reciprocal fashion: out, when pressure is applied to the pressure chamber, and in, when that pressure is released.

The original position of the piston 20 within the cylinder housing may vary with the amount of wear currently present in the brake pads 14. This result is accomplished through the use of a pressure check valve 44 attached to the conduits 18 at some point prior to the pressure chamber 26. This check valve 44 retains pressure within the pressure chambers 26 at an arbitrary minimum pressure, for example, 3 p.s.i., when the system is at rest. The foregoing constant retention of a minimum amount of pressure in the pressure chamber which maintains a minimum desired contact with the brake disc 12, thus preventing a jar or a time lag in that contact when the piston is actuated and the braking is effected by the brake pads 14 against the disc 12. The minimum pressure exerted is of such magnitude as to prevent the piston from retracting any more than required to maintain contact with the brake pads 14 in a substantially frictionless manner. The pressure applied would obviously, and of necessity, be different for diaphragms of differing resiliency. For a diaphragm having low resilience, and therefore exerting more force pulling the piston inward, the minimum pressure must be greater than for a diaphragm of high resiliency.

As shown in FIG. 6, the cylinder assembly 42 is a unit, each component connected to another and all components being thereby interconnected. Attachment of the cylinder assembly 42 to the disc brake housing 28 is accomplished by means of bolts (not shown) through the opening 40 on the cylinder assembly 42. Being an integral unit, repair may be effected by the simple replacement of the defective unit. This is in direct contrast to prior disc brake cylinder and piston assemblies, which must be, as stated above, replated and reground, and each individual component laboriously removed and replaced.

While in the embodiment shown and described herein two pistons contact their respective brake pads for exerting force upon the brake disc, the use of a single piston and cylinder subassembly for contact with a single brake pad is foreseen and intended as embodied within the teachings of this invention.

The invention thus provides a unique means of sealing a movable piston and to effect easier manufacture, easier assembly, longer life and easier repair.

While the invention has been described with reference to the preferred embodiment, it will be understood by those skilled in the art that various changes may be made and equivalents may be substituted for elements thereof without departing from the scope of the invention. In addition, many modifications may be made to adapt the particular situation or materials to the teachings of the invention without departing from the essential scope thereof. Therefore, it is intended that this invention not be limited to the particular embodiment disclosed as the best mode contemplated for carrying out this invention, but that the invention will include all embodiments falling within the scope of the appended claims.

What is claimd is:

1. A disc brake caliper assembly having a brake disc, brake pad means for selectively contacting said disc, a pressure chamber, a hydraulic fluid pressure feed means coupling to said chamber, a cylinder communicating with said chamber, a piston having a front and back face, said piston being mounted for reciprocal movement within said cylinder and having the front face of said piston positioned adjacent a respective brake pad means and the back face of said piston positioned to be responsive to fluid pressure for thereby transmitting the pressure to said brake pad means which, in turn, apply a pressure to the associated disc in response to increased hydraulic fluid pressure, wherein the improvement lies in said assembly including a resilient plate adjacent said pressure chamber forming a fluid-tight seal, and having a first surface in contact with said hydraulic fluid and an opposite surface, a central portion of said opposite surface adhesively united with the back face of said piston and a peripheral portion of said opposite surface united with said cylinder, said piston having on the periphery of said back face an inwardly directing flange on a plane substantially parallel to said back face for cooperation with the adhesive engagement of said central portion of said opposite surface in uniting said resilient seal plate to said back face of said piston, whereby the pressure exerted against said first surface of said resilient plate by said fluid for actuation of said brake disc concurrently prevents loss of said fluid through said cylinder.

* * * * *